(12) United States Patent
Barna et al.

(10) Patent No.: US 6,720,544 B2
(45) Date of Patent: Apr. 13, 2004

(54) FEEDBACK STABILIZED LIGHT SOURCE WITH RAIL CONTROL

(75) Inventors: Sandor L. Barna, Pasadena, CA (US); Scott Patrick Campbell, Thousand Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 41 days.

(21) Appl. No.: 10/121,921

(22) Filed: Apr. 11, 2002

(65) Prior Publication Data

US 2003/0193008 A1 Oct. 16, 2003

(51) Int. Cl.$^7$ ................................................. G01J 1/32
(52) U.S. Cl. ................................. 250/205; 250/214 R
(58) Field of Search ............................. 250/205, 214 R, 250/214 A, 214 LA; 330/308, 59; 327/514; 257/80–84, 290, 431, 432

(56) References Cited

U.S. PATENT DOCUMENTS

| 4,577,320 A | * | 3/1986 | Yoshikawa et al. | .... 372/29.012 |
| 5,097,473 A | * | 3/1992 | Taguchi | ............... 372/29.011 |

* cited by examiner

*Primary Examiner*—Que T. Le
(74) *Attorney, Agent, or Firm*—Dickstein Shapiro Morin & Oshinsky LLP

(57) ABSTRACT

A digitally controlled light source system. The light source produces an output which is sensed by a photoreceptor within the feedback loop of an operational amplifier. This maintains the output of the light source constant. The feedback loop can also have a digital control system, to enable digital control of the output.

17 Claims, 3 Drawing Sheets

FEEDBACK STABILIZED LIGHT SOURCE WITH RAIL CONTROL

BACKGROUND

It is often desirable to produce light which is controlled to produce a constant and stabilized output. It may be challenging to control simple semiconductor light sources, such as light emitting diodes (LEDs), using simple circuitry.

SUMMARY

According to the present system, a simple circuit is described which obviates many of these problems. The circuit uses a semiconductor light source and a semiconductor photoreceptor within the feedback loop of a controlled amplifier. The amplifier can be an operational amplifier which uses the light source and photoreceptor within its feedback loop. The photoreceptor senses a level of the illumination light, and the operation of the feedback loop maintains that illumination light constant at a desired level. In an embodiment, the illumination light may be varied according to a digital control.

BRIEF DESCRIPTION OF THE DRAWINGS

These and other aspects will now be described in detail with reference to the accompanying drawings, wherein.

DETAILED DESCRIPTION

Figure 1:
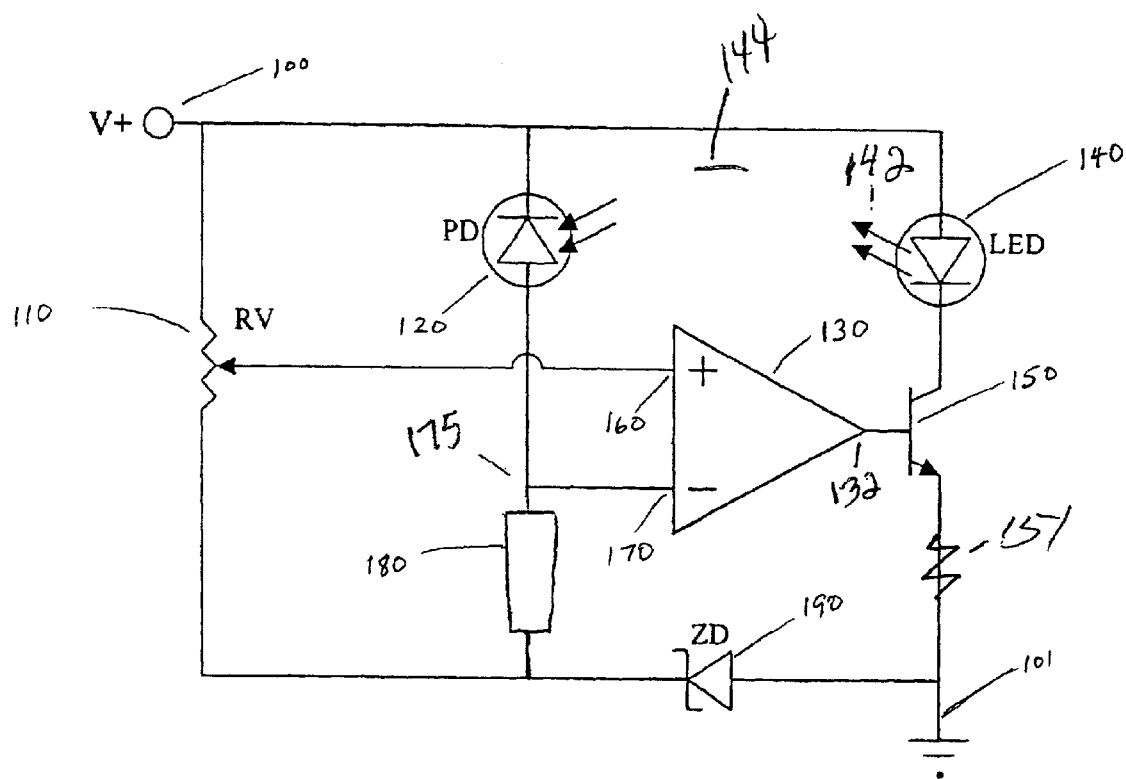
FIG. 1 shows a first embodiment using a photoreceptor and light source in a feedback loop of an operational amplifier.

According to an embodiment, the output light of a light source, e.g., a semiconductor based light source such as a light emitting diode 140, is to be controlled. LED 140 is biased at one end by a voltage 100. The other end of LED 140 is connected through transistor 150 to ground. When transistor 150 is completely on, full conduction occurs through the transistor, allowing LED 140 to be maintained at its maximum output value through current limiting resistor 151. A lower level of drive to the transistor 150 may allow somewhat less current to be drawn, thus limiting the light output of the LED.

The output 142 of LED 140 illuminates a desired object. In addition, photoreceptor 120, which can be a photodiode, or any other device that produces a voltage or current output based on applied illumination, is located spaced from LED 140. Photoreceptor 120 is in a location where it may preferentially receive the output from LED 120, and may be shielded from ambient or other interfering light. For example, a light shroud 144 may be placed to shield between the LED 140 and the photodiode 120.

The photodiode 120 also forms part of the feedback loop of the operational amplifier. Photogenerated current is converted to voltage by resistance element 180 to create a voltage at node 175. This voltage at node 175 is compared with a reference voltage Rv from variable resistor 110.

The operational amplifier inputs represent low reference voltages. In order to keep the inputs above the power rails, resistance element 180 is held above the supply line ground 101 by the potential across a voltage reference, here zener diode 190. Therefore, the minimum voltage that can be developed across resistance element 180 is established by the zener diode 190. Other voltage references could alternatively be used, for example a semiconductor regulator.

The operational amplifier output 132 controls the degree of turn on of the transistor 150, which correspondingly controls the amount of light output of the LED. Again, this light output is applied to the photodiode, to vary the photogenerated current.

In operation, initially the circuit is powered down. Since the photodiode is initially receiving no or little current, the negative input 170 of the operational amplifier is biased by close-to-zero voltage. The positive input of the operational amplifier receives the voltage from the voltage reference Rv. Therefore, the op amp produces its maximum output, to turn on the transistor 150. As the LED produces light, a voltage is induced by the photogenerated current from the photodiode, across resistance element 180, thus reducing the drive to the transistor. Eventually, the light output from the LED 140 stabilizes.

The resistance element 180 may be a resistor or may be a combination of a resistor and other active and/or inactive elements.

Therefore, in operation, the LED produces an output illumination amount which is continually maintained by the feedback loop. In addition, since the zener diode 190 maintains the inverting input above the power supply rail, the operation is independent of the voltage reference of the op amp.

Figure 2:
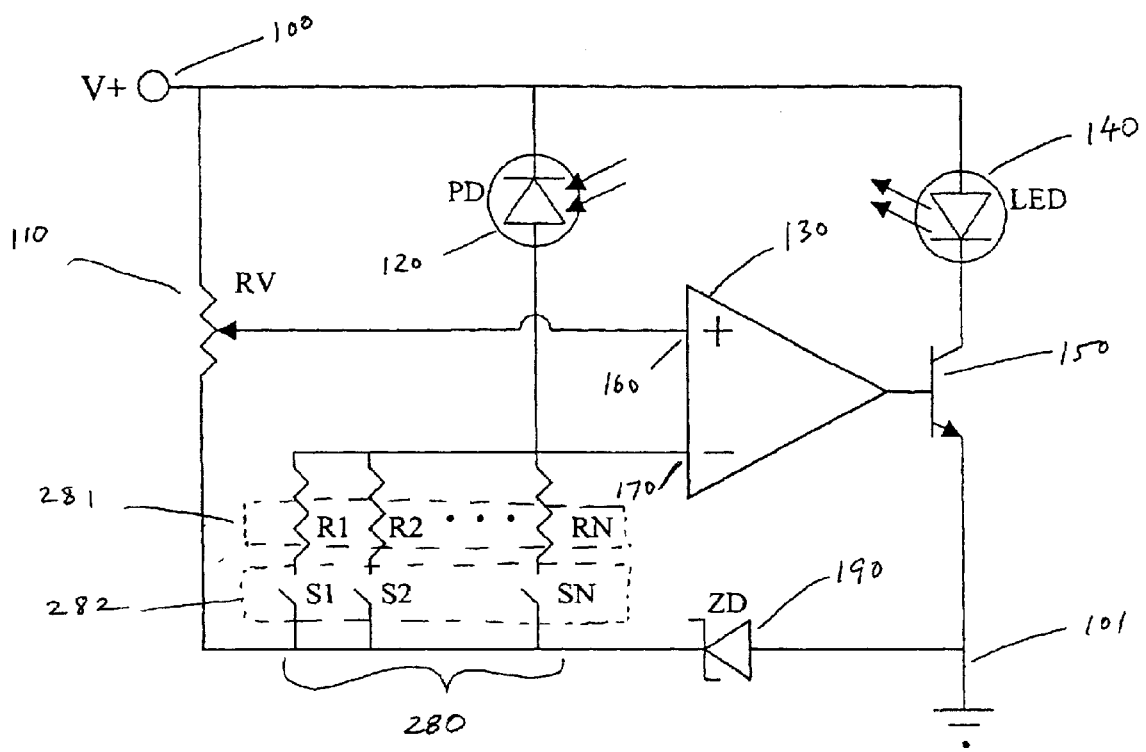
FIG. 2 shows a second embodiment in which the intensity of the output light is controlled.

A second embodiment shown in FIG. 2 enables digital control of the intensity of light output. In this embodiment, the resistance element 180 is formed by a switched resistance ladder 280. The switched resistance ladder 280 includes a plurality of resistors R1, R2, . . . RN, which form a scaled resistance network. These resistors are each coupled in series with a switched element S1, S2, . . . SN. Switch array 282 enables different ones of the resistors to be switched in and out of the circuit.

Figure 3:
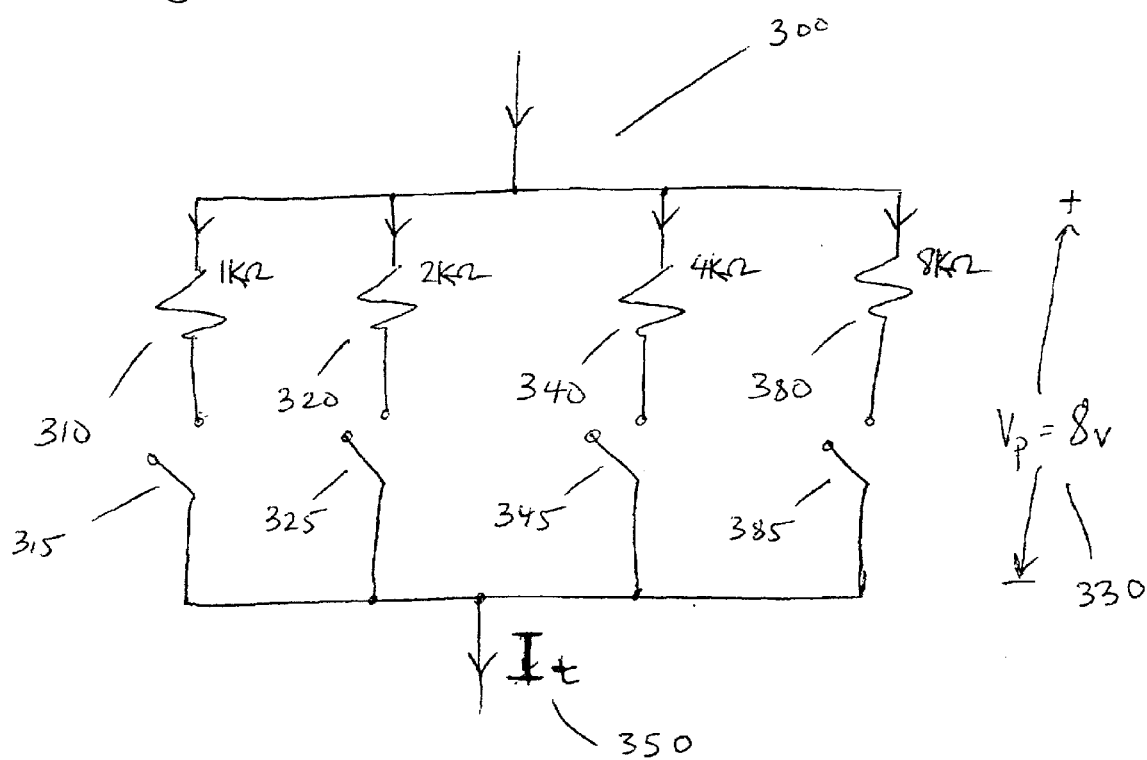
FIG. 3 shows a detail of the digital control.

The resistors are scaled according to powers of 2 as shown in FIG. 3. Therefore, the total current that passes through the resistors is effectively digitally weighted. A digital word may be used to select which of the switches S1-SN are closed. Closing the switches adjusts the resistance to ground, thereby changing the voltage that is produced by the induced photocurrent.

The values on the switches hence effectively form a digital word that allows digital control of the output of the LED. Each time these values are changed, the output of the LED is correspondingly changed, according to the digital weighting.

Although only a few embodiments have been disclosed in detail above, other modifications are possible. All such modifications are intended to be encompassed within the following claims, in which:

What is claimed is:

1. A light control circuit, comprising:
   a semiconductor based light source which illuminates based on an amount of drive thereto;
   an analog amplifier;
   a semiconductor based photoreceptor, located adjacent said semiconductor light source, to receive light from said light source; and
   a digitally-controlled resistance element, controlled by a plurality of bits, said digitally-controlled resistor element being coupled to said semiconductor based photoreceptor, for producing a control signal based on light received at said photoreceptor and based on values of said plurality of bits;

wherein said analog amplifier has a first input which receives a signal voltage, and a second input which receives said control signal, said analog amplifier producing said amount of drive based on a relationship between said first input and said second input.

2. The light control circuit of claim 1, wherein said semiconductor based light source is a light emitting diode.

3. The light control circuit of claim 2, further comprising a transistor, driven by said output of said analog amplifier, and having an output terminal coupled to said light emitting diode.

4. The light control circuit of claim 2, further comprising a voltage reference, connected between said second input of said analog amplifier and a voltage terminal, thereby maintaining said second input of said analog amplifier at a level biased relative to said voltage terminal by an amount of said voltage reference.

5. The light control circuit of claim 1, further comprising a voltage reference, connected between said second input of said analog amplifier, and ground, thereby maintaining said second input of said analog amplifier at a level biased relative to ground by an amount of said voltage reference.

6. The light control circuit of claim 1, wherein said digitally-controlled resistance element includes a resistive ladder.

7. The light control circuit of claim 6, wherein said resistive ladder includes resistances which are weighted according to powers of $2^n$.

8. The light control circuit of claim 7, further comprising switches which select which of said resistances within said resistive ladder are used, and others of which are open circuited.

9. The light control circuit of claim 1, further comprising a voltage reference between said digitally controlled resistance element and ground, maintaining said analog amplifier above a ground level.

10. The light control circuit of claim 1, further comprising a light shielding element, adjacent said light emitting diode and said photoreceptor, and blocking outside light from reaching said photoreceptor.

11. The light control circuit of claim 1, wherein said photoreceptor includes a photodiode.

12. The light control circuit of claim 11, wherein said analog amplifier includes an operational amplifier.

13. A circuit, comprising:

a semiconductor light source;

an analog amplifier, having an output which drives said semiconductor light source, and operating based on feedback within a feedback loop, said feedback loop feeding back a signal indicative of an amount of received light from said semiconductor light source; and a digital control element, located within a feedback loop of the analog amplifier, and producing a digitally controlled resistance within said feedback loop;

wherein said digitally controlled resistance controls an amount of drive of said analog amplifier.

14. The circuit of in claim 13, further comprising a photoreceptor within said feedback loop, which produces said signal indicative of amount of received light.

15. The circuit of claim 14, wherein said digitally controlled resistance includes a plurality of weighted resistors and a plurality of switches.

16. The circuit of claim 15, further comprising a voltage reference which maintains a level of said analog amplifier above ground by a specified amount.

17. A method for controlling an optical system having a light source and a photosensitive element, comprising:

generating a voltage, said voltage being based on light sensed from said light source by said photosensitive element, and said voltage being further based on a resistance controlled by a digital control word;

applying said voltage within a feedback loop of an analog amplifier to set an amount of drive to said light source.

* * * * *

UNITED STATES PATENT AND TRADEMARK OFFICE
CERTIFICATE OF CORRECTION

PATENT NO. : 6,720,544 B2
DATED : April 13, 2004
INVENTOR(S) : Sandor L. Barna et al.

It is certified that error appears in the above-identified patent and that said Letters Patent is hereby corrected as shown below:

Column 2,
Line 63, reads "light source" should read -- photoreceptor --

Signed and Sealed this

Thirtieth Day of November, 2004

JON W. DUDAS
*Director of the United States Patent and Trademark Office*